United States Patent
Mizuno et al.

(10) Patent No.: US 7,631,570 B2
(45) Date of Patent: Dec. 15, 2009

(54) TRANSMISSION

(75) Inventors: Kinya Mizuno, Saitama (JP); Yasushi Fujimoto, Saitama (JP); Seiji Hamaoka, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 11/527,382

(22) Filed: Sep. 27, 2006

(65) Prior Publication Data

US 2007/0074594 A1  Apr. 5, 2007

(30) Foreign Application Priority Data

Sep. 30, 2005 (JP) ............... 2005-287984

(51) Int. Cl.
*F16H 3/08* (2006.01)
*F16H 59/00* (2006.01)

(52) U.S. Cl. ........................... 74/331; 74/337.5
(58) Field of Classification Search ............... None
See application file for complete search history.

(56) References Cited

U.S. PATENT DOCUMENTS

| 6,370,977 | B1 | 4/2002 | Kubo et al. | |
|---|---|---|---|---|
| 6,443,275 | B1 | 9/2002 | Hori et al. | |
| 2002/0152823 | A1 | 10/2002 | Wild et al. | |
| 2004/0025630 | A1 | 2/2004 | Hori et al. | |
| 2007/0199392 | A1* | 8/2007 | Mizuno et al. ............... | 74/325 |
| 2008/0023291 | A1* | 1/2008 | Sorani et al. ............... | 192/87.1 |
| 2008/0220936 | A1* | 9/2008 | Kobayashi et al. ............ | 477/70 |
| 2008/0229854 | A1* | 9/2008 | Mizuno et al. ............... | 74/335 |
| 2008/0236316 | A1* | 10/2008 | Mizuno et al. ............... | 74/335 |
| 2009/0025498 | A1* | 1/2009 | Sotani et al. ................. | 74/404 |

FOREIGN PATENT DOCUMENTS

| DE | 30 37 990 A1 | 5/1982 |
|---|---|---|
| DE | 199 15 522 A1 | 10/2000 |
| DE | 101 28 854 A1 | 12/2002 |
| DE | 10 2004 006 807 A1 | 9/2005 |
| EP | 1 580 454 A1 | 9/2005 |
| FR | 2 500 101 A1 | 8/1982 |
| JP | 6-17912 A | 1/1994 |
| JP | 6-207648 A | 7/1994 |

* cited by examiner

*Primary Examiner*—Dirk Wright
(74) *Attorney, Agent, or Firm*—Birch, Stewart, Kolasch & Birch, LLP

(57) ABSTRACT

A transmission includes a first shifting part and a second shifting part which shift power of an internal combustion engine, a first shift clutch transmitting and interrupting the power to the first shifting part, and a second shift clutch transmitting and interrupting the power to the second shifting part, and a selection mechanism which selects gear steps. The selection mechanism includes three shifters that are respectively guided by cam grooves of a single shift drum through shift forks. The shifters can be respectively moved to selection positions where the gear steps are selected and to neutral positions where the gear steps are not selected in the first shifting part and the second shifting part. The cam grooves guide the shifters to the selection positions in each of the first shifting part and the second shifting part for each of predetermined rotational positions of the shift drum.

20 Claims, 5 Drawing Sheets

TRANSMISSION

CROSS-REFERENCE TO RELATED APPLICATIONS

This nonprovisional application claims priority under 35 U.S.C. § 119(a) on Patent Application No. 2005-287984, filed in Japan on Sep. 30, 2005, the entirety of which is incorporated herein by reference.

BACKGROUND OF THE INVENTION

1. Field of the Invention

The present invention relates to a transmission that changes the speed of the power of an engine. More particularly, the present invention relates to a transmission that shifts gears by a first shift clutch and a second shift clutch to which the power of the engine is transmitted.

2. Description of Background Art

A transmission including first and second shift clutches to which power of an engine is transmitted is disclosed in, for example, Japanese Patent Application Laid-Open No. Hei 6-17912. The transmission includes first and second clutches to which the power from an output shaft of the engine is transmitted, and a plurality of shifting systems for shifting gear steps. One of the shifting systems includes a change drum that is driven for rotation by a step motor, and the gear step is established at the time of engagement of the second clutch. In addition, each of the other shifting systems includes another change drum that is driven for rotation by another step motor, and the gear step is established at the time of engagement of the first clutch.

Incidentally, the provisions of the change drum and the step motor for each of the first and second clutches result in a large-scale transmission and an increase in cost.

SUMMARY OF THE INVENTION

The present invention has been made in view of such a circumstance, and a first aspect of the present invention aims at providing a downsizable and inexpensive transmission in which a first shift clutch and a second shift clutch to which a power of an engine is transmitted shift gears. Furthermore, second and third aspects of the present invention aim at downsizing the transmission in the axial direction.

The first aspect of the present invention is a transmission which includes a first shifting part and a second shifting part which shift power of an engine, a first shift clutch transmitting and interrupting the power to the first shifting part, a second shift clutch transmitting and interrupting the power to the second shifting part, and a selection mechanism which selects gear steps in the first shifting part and the second shifting part, in which the first shift clutch and the second shift clutch shift gear steps of the first shifting part and gear steps of the second shifting part, wherein the selection mechanism includes one shift drum rotated based on a shifting operation and shifters guided and moved by guide portions disposed on the shift drum in accordance with rotation of the shift drum, the shifters is movable to selection positions where the gear steps are selected and to neutral positions where the gear steps are not selected in the first shifting part and the second shifting part, and the guide portions guide the shifters to the selection positions in the first shifting part and the second shifting part with respect to one of predetermined rotational positions of the shift drum.

According to the above, in the transmission in which the gear step is shifted by the first and second shift clutches that transmit and interrupt the power of the engine to the first and second shift parts that respectively set the gear steps, the gear steps in the first and second shift parts can be selected at the same time by one shift drum, so that a plurality of shift drums are not needed and one drive section for driving the shift drum is sufficient. Furthermore, the gearshifts between the selected two gear steps are performed only by switching transmission paths for the power with the first and second shift clutches.

According to the second aspect of the present invention, the first shifting part includes a first shift element and a second shift element each setting the gear steps, the shifters include a first shifter that is configured by the first shift element and that moves in the axial direction of the shift drum and a second shifter that is configured by the second shift element and that moves in the axial direction of the shift drum, and the guide portions guide the first and second shifters in such a manner that the gear step is selected by the first shift element when the first shifter is in the neutral position and the second shifter is in the selection position, and the gear step is selected by the second shift element when the second shifter is in the neutral position and the first shifter is in the selection position.

According to the above, the shift element for setting the gear step in the first shifting part also serves as the shifter, so that there is no need to provide another shifter different from the shift element between the shift elements.

According to the third aspect of the present invention, an input shaft includes a first input shaft and a second input shaft to which the power is transmitted, the first input shaft which specifies the length of the input shaft and on which the first shift part is provided is longer than the second input shaft on which the second shift part is provided.

According to the above, in the input shaft configured by the first and second input shafts, the first input shaft longer than the second input shaft can be made much shorter because the shift element also serves as the shifter in the first shifting part provided on the first input shaft.

According to a fourth aspect of the present invention, the selection mechanism includes one electric motor and a shift spindle that is driven for rotation by the electric motor to rotate the shift drum.

According to the above, the shift spindle that has conventionally been used in the selection mechanism of a manual type can be used as it is. Furthermore, by using the transmission in a saddle-ride type all terrain vehicle (ATV) and a motorcycle, the shift drum and the shift spindle can be arranged at the same positions as a conventional gearshift mechanism (gear change mechanism) operated by using a foot, so that the transmission can be mounted as a power unit of a vehicle with an automatic transmission without largely changing the configuration of a vehicle with a manual transmission.

According to a fifth aspect of the present invention, the selection mechanism includes an intermittent feeding mechanism that allows the shift drum to intermittently rotate in accordance with the rotation of the shift spindle.

According to the above, the intermittent feeding mechanism that has conventionally been used in the selection mechanism of a manual type can be used as it is. Furthermore, similar to the fourth aspect of the present invention, the transmission can be mounted as a power unit of a vehicle with an automatic transmission without largely changing the configuration of a vehicle with a manual transmission.

According to a sixth aspect of the present invention, the guide portions guide the shifters to the selection positions in the first shifting part and the second shifting part so that the first speed gear step and the second speed gear step of the first speed gear step, the second speed gear step, and the third speed gear step as the three consecutive gear steps from the low speed side are selected in the adjacent two predetermined rotation positions of the shift drum.

According to the above, the gearshifts between the second speed gear step, and the first speed gear step and the third speed gear step that interpose the second speed gear step therebetween are performed by switching the first and second shift clutches.

According to the first aspect of the present invention, since the gear steps in the first and second shifting parts are selected by one shift drum, there can be obtained the transmission that can be downsized and is inexpensive due to the reduction of the number of parts.

According to the second aspect of the present invention, since the shift element also serves as the shifter, the shift drum can be downsized in the axial direction, and further the transmission can be downsized in the axial direction.

According to the third aspect of the present invention, since the longer first input shaft which specifies the length of the input shaft can be shortened, the transmission can be downsized in the axial direction.

According to the fourth and fifth aspects of the present invention, the automation of the selection mechanism due to the employment of the electric motor can be possible at low cost.

According to the sixth aspect of the present invention, shifting to adjacent gear steps can be possible by switching the first and second clutches without rotating the shift drum at the time of gearshift, so that smooth acceleration and deceleration and the gearshifts with a little shock can be performed and thus the ride quality is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
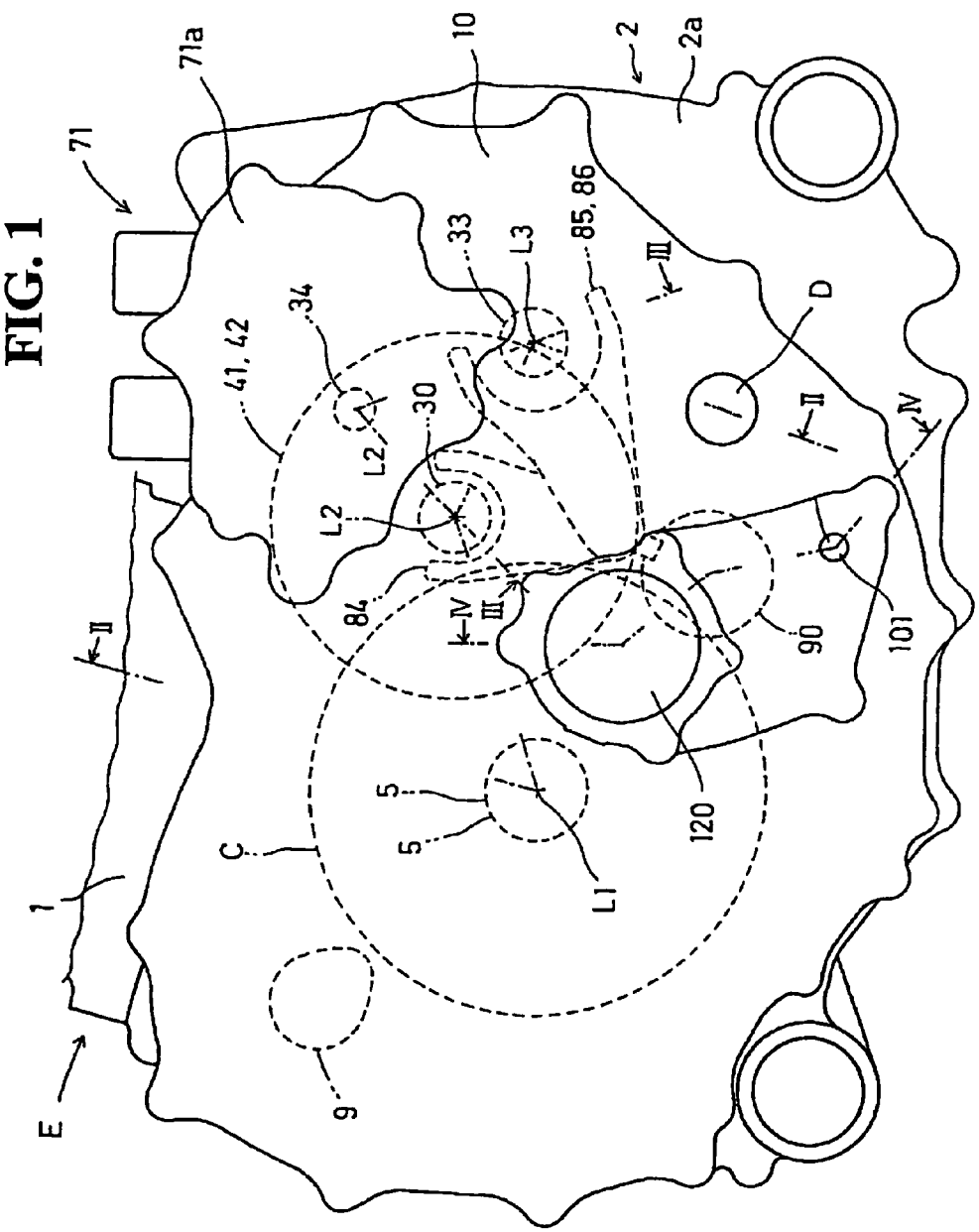
FIG. 1 shows an embodiment of the present invention and is a schematic front view of an essential part of a power unit having an internal combustion engine and a transmission.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 2:
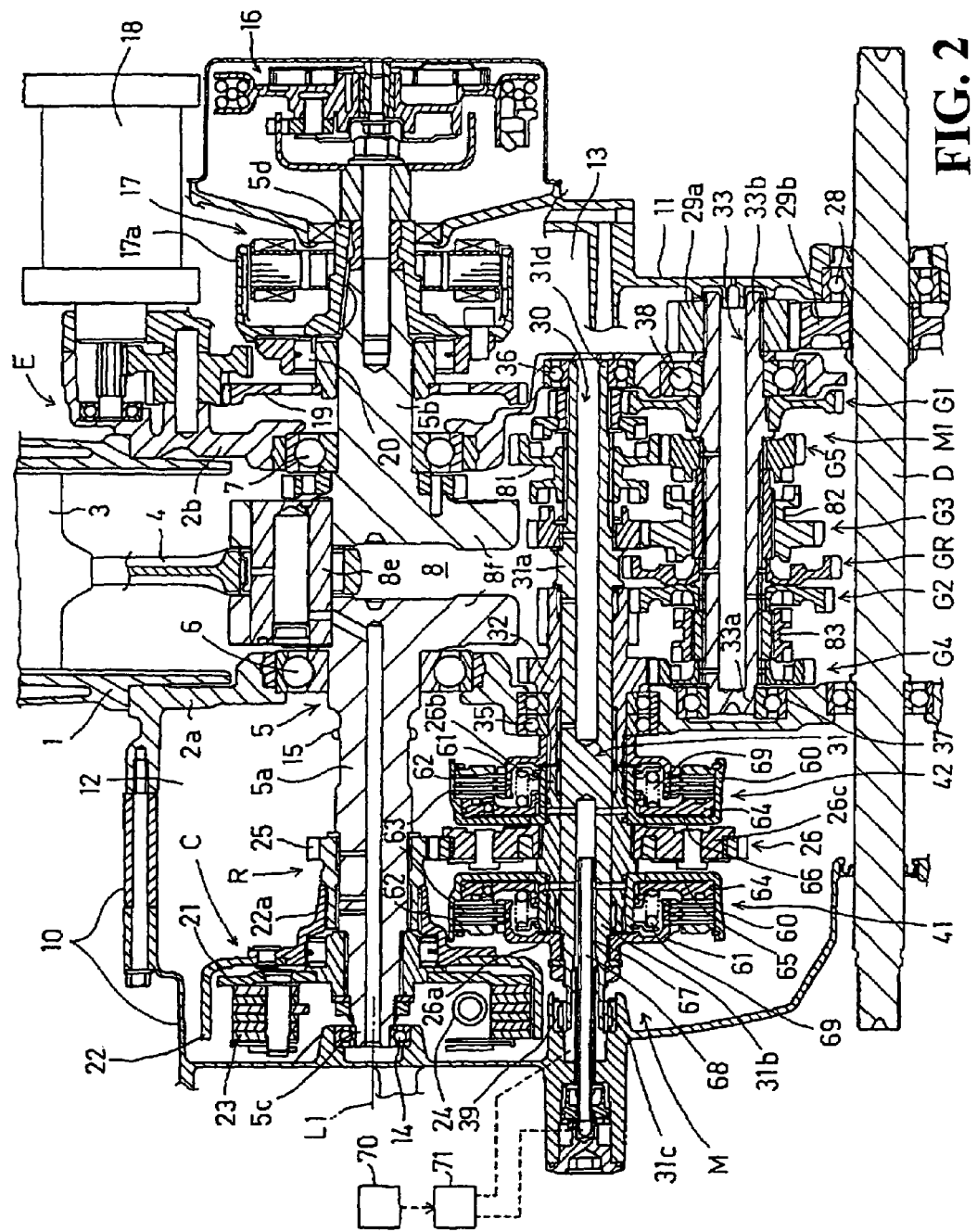
FIG. 2 is a schematic cross-sectional view taken along line II-II of FIG. 1.

An embodiment of the present invention will be described below with reference to FIGS. 1 to 5. Referring to FIGS. 1 and 2, a vehicular power transmission system to which the present invention is applied and which includes a gear transmission M as an automatic transmission, constructs a power unit mounted on a saddle-ride type ATV (All Terrain Vehicle) as a vehicle together with an internal combustion engine E as an engine. The power transmission system has the constant-mesh type gear transmission M (hereinafter, called a "transmission M") selecting gear trains G1 to G5 and GR from shift gear trains M1 to establish a running gear step, a centrifugal clutch C constructing a start clutch transmitting and interrupting a power produced by the internal combustion engine E to the transmission M, and a drive axle D to which the power shifted by the transmission M is transmitted. The power of the drive axle D is transmitted to a front wheel and a rear wheel via a front drive shaft and a rear drive shaft, and then, the wheels are rotatably driven.

The internal combustion engine E is a water-cooled type single-cylinder four-stroke internal combustion engine and has an engine body having a cylinder 1 in which a piston 3 is fitted and reciprocated, a cylinder head and a head cover sequentially stacked on the cylinder 1 to be coupled, and a crankcase 2 coupled to the lower end of the cylinder 1. The crankcase 2 as a housing rotatably supporting a crankshaft 5 having a rotation center line L1 orienting the front and rear directions of a vehicle body via a pair of main bearings 6 and 7 is constructed by coupling two case half bodies 2a and 2b divided into two in an axial direction as the direction of the rotation center line L1, here, the front case half body 2a and the rear case half body 2b to form a crank chamber 8 housing a crank part of the crankshaft 5. The crank part is a part including a crankpin 8e and a crank web 8f.

The internal combustion engine E has an intake valve and an exhaust valve which open and close an intake port and an exhaust port disposed on the cylinder head, and an over-head valve system opening and closing the intake valve and the exhaust valve by a push rod driven by a valve cam of a camshaft 9 in synchronization with rotation of the crankshaft 5. The piston 3 driven by a combustion pressure produced by combusting an air-fuel mixture drawn in from the intake port in a combustion chamber formed between the piston 3 and the cylinder head rotatably drives the crankshaft 5 via a connecting rod 4.

The crankshaft 5 as an output shaft of the internal combustion engine E has a front extension part 5a and a rear extension part 5b extended forward and rearward from the crank chamber 8. The term "front" means one side of an axial direction of the crankshaft 5a and the term "rear" means the other side of the axial direction thereof, and vice versa. The terms "front" or "rear" can mean one side or the other side of the axial direction.

The front case half body 2a is coupled to a front cover 10 covering the front case half bodies 2a and 2b from the front side. The front case half body 2a and the front cover 10 form a front housing 12. The front extension part 5a extended forward from the main bearing 6 held by the front case half body 2a is extended in the front housing 12. A front shaft end 5c is rotatably supported by the front cover 10 via a bearing 14. The rear case half body 2b is coupled to a rear cover 11 covering the rear case half body 2b from the rear side. The rear case half body 2b and the rear cover 11 form a rear housing 13.

The rear extension part 5 extended rearward from the main bearing 7 held by the rear case half body 2b is extended in the rear housing 13.

In the front housing 12, the front extension part 5a is provided sequentially with the front shaft end 5c, the centrifugal clutch C, a primary speed reduction mechanism R, and a driving sprocket 15 constructing a transmission mechanism for valves rotatably driving the camshaft 9. In the rear housing 13, the rear extension part 5b is provided sequentially with a rear shaft end 5d coupled to a recoil starter 16, an alternator 17, and a starting driven gear 19 constructing a starting speed reduction mechanism transmitting rotation of a starter motor 18 attached to the rear cover 11 to the crankshaft 5. The driven gear 19 is coupled to a rotor 17a of the alternator 17 via a one-way clutch 20.

The centrifugal clutch C has a plate-like clutch inner 21 as an input member integrally rotated with the crankshaft 5, a bowl-like clutch outer 22 as an output member surrounding the clutch inner 21 outward in the diameter direction, and a clutch shoe 23 pivoted by the clutch inner 21 and serving as a centrifugal weight controlling the intermittent state of the centrifugal clutch C by a centrifugal force produced in accordance with the rotational speed of the crankshaft 5 as an engine rotational speed. When the engine rotational speed exceeds an idling speed, the clutch shoe 23 against a resilience force of a clutch spring 24 is swung outward in the diameter direction of the crankshaft 5 by the centrifugal force to start being contacted with the clutch outer 22. The power of the internal combustion engine E is transmitted from the clutch inner 21 to the clutch outer 22. As the engine rotational speed is increased, the centrifugal clutch C is changed through the partial clutch engagement state (partial connected state) in which the clutch outer 22 is rotated while causing slight sliding between it and the clutch shoe 23, and then, into the perfect connected state in which the clutch inner 21 is rotated integrally with the clutch outer 22.

The primary speed reduction mechanism R has a driving gear 25 as a driving rotor relatively rotatably supported by the front extension part 5a and spline fitted in a boss part of the clutch outer 22 to be integrally rotatably coupled to the clutch outer 22, and a driven gear 26 as a driven rotor engaged with the driving gear 25 and provided with a damper suppressing rotation fluctuation of the crankshaft 5. The driven gear 26 relatively rotatably disposed on a first main shaft 31 and a second main shaft 32 of the transmission M has a pair of front and rear coupling parts 26a and 26b having boss parts extended in the front and rear directions by interposing therebetween a disc part 26c in the outer periphery of the first main shaft 31, and transmits the power to a first shift clutch 41 and a second shift clutch 42 of the transmission M via a front coupling part 26a and a rear coupling part 26b. The primary speed reduction mechanism R is a transmission mechanism transmitting the power from the centrifugal clutch C to the first shift clutch 41 and the second shift clutch 42.

Figure 3:
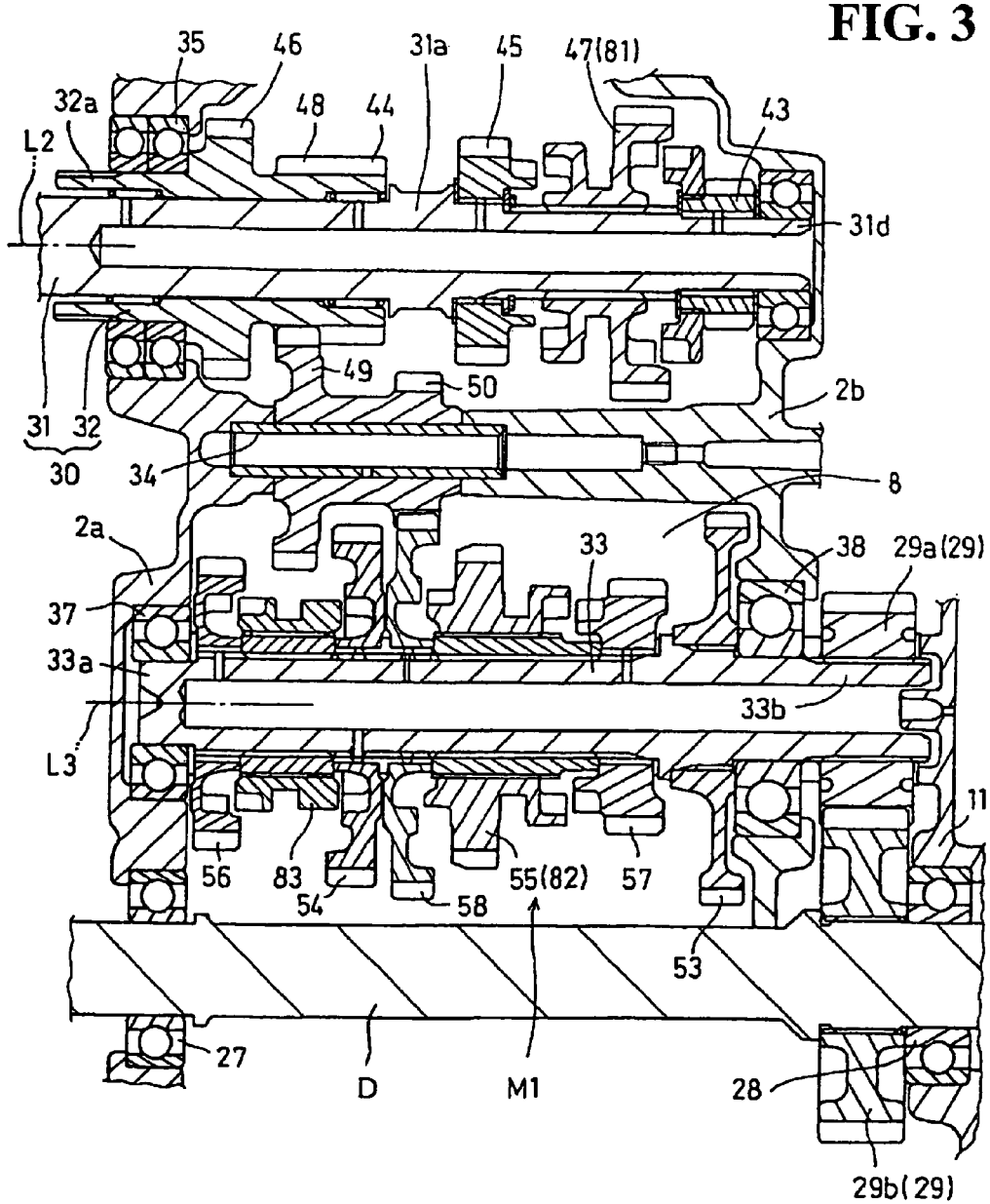
FIG. 3 is a schematic cross-sectional view taken along line III-III of FIG. 1.

Referring to FIG. 3, the transmission M has a main shaft 30 as an input shaft and a counter shaft 33 as an output shaft rotatably supported via bearings 35, 36, and 37, 38 by the front case half body 2a and the rear case half body 2b and having rotation center lines L2 and L3 in parallel with the rotation center line L1. An intermediate shaft 34 is fixed at both ends to the front case half body 2a and the rear case half body 2b and has a center axis line in parallel with the rotation center line L1. The transmission M also includes the shift gear trains M1 as a collection of the gear trains G1 to G5 and GR setting gear steps. A selection mechanism M2 selects specified gear steps for realizing shifting at a running gear ratio set by an electronic controlled unit 70 based on a signal from the later-described driving state detection means 74. The first shift clutch 41 and the second shift clutch 42 transmit and interrupt the power of the internal combustion engine E to the shift gear trains M1. In the transmission M, the main shaft 30, the counter shaft 33, the intermediate shaft 34, and the drive axle D are arranged in parallel with the crankshaft 5 and are supported by the crankcase 2 serving as a transmission case.

The main shaft 30 has the first main shaft 31 and the second main shaft 32 arranged across the crank chamber 8 and the front housing 12. The first main shaft 31 is relatively rotatably and coaxially extended through the second main shaft 32 constructed of a hollow shaft. The first main shaft 31 having a shaft length longer than that of the second main shaft 32 to define the shaft length of the main shaft 30 has an inner shaft part 31a housed in the crank chamber 8 and an outer shaft part 31b housed in the front housing 12. The outer shaft part 31b as an extension part extended forward from the bearing 35 in the front housing 12 is rotatably supported by the front cover 10 via a bearing 39 at a front shaft end 31c. The outer shaft part 31b is provided sequentially with the first shift clutch 41, the driven gear 26, and the second shift clutch 42 from a front shaft end 39c toward the crankcase 2. The driven gear 26 is arranged between both the shift clutches 41 and 42 in the axial direction of the main shaft 30. A rear shaft end 31d of the first main shaft 31 is supported by the rear case half body 2b.

In the counter shaft 33 in which a front shaft end 33a is supported by the bearing 37, a rear shaft end 33b protruded rearward from the bearing 38 to be extended in the rear housing 13 is provided with an outputting driving gear driving the drive axle D rotatably supported by the front case half body 2a and the rear case half body 2b via bearings 27 and 28. An outputting driving gear 29a constructs a secondary speed reduction mechanism 29 as a transmission mechanism reducing the speed of the power from the transmission M and transmitting it to the drive axle D together with an outputting driven gear 29b disposed on the drive axle D. The secondary speed reduction mechanism 29 is housed in the rear housing 13.

Referring to FIGS. 2 and 3, the shift gear trains M1 as shift elements housed in the crank chamber 8 serving as a transmission chamber have the shift gear trains G1 to G5 and GR as plural shift elements setting plural gear steps. Specifically, the first speed gear train G1 setting a first speed gear step has a driving gear 43 relatively rotatably disposed on the inner shaft part 31a, and a driven gear 53 engaged with the driving gear 43 and integrally rotatably disposed on the counter shaft 33. The second speed gear train G2 setting a second speed gear step has a driving gear 44 integrally molded with the second main shaft 32 and integrally rotatably disposed thereon, and a driven gear 54 engaged with the driving gear 44 and relatively rotatably disposed on the counter shaft 33. The third speed gear train G3 setting a third speed gear step has a driving gear 45 relatively rotatably disposed on the inner shaft part 31a, and a driven gear 55 engaged with the driving gear 45 and integrally rotatably disposed on the counter shaft 33. The fourth speed gear train G4 setting a fourth speed gear step has a driving gear 46 integrally molded with the second main shaft 32 and integrally rotatably disposed thereon, and a driven gear 56 engaged with the driving gear 46 and relatively rotatably disposed on the counter shaft 33. The fifth speed gear train G5 setting a fifth speed gear step has a driving gear 47 integrally rotatably disposed on the inner shaft part 31a, and a driven gear 57 engaged with the driving gear 47 and relatively rotatably disposed on the counter shaft 33. The rearward gear train GR setting a rearward gear step has a driving gear 48 integrally molded with the driving gear 44, a driven gear 58 relatively rotatably disposed on the counter shaft 33, a first intermediate gear 49 engaged with the driving gear 48 and relatively rotatably disposed on the intermediate shaft 34, and a second intermediate gear 50 engaged with the driven gear 58 and integrally molded with the first intermediate gear 49 to be integrally rotated.

The gear trains G1, G3, and G5 having the driving gears 43, 45, and 47 disposed on the first main shaft 31 construct a first shifting part for shifting the power of the internal combustion engine E. The first shift clutch 41 transmits and interrupts the power to the first shifting part. The gear trains G2, G4, and GR having the driving gears 44, 46, and 48 disposed on the second main shaft 32 construct a second shifting part for shifting the power of the internal combustion engine E. The second shift clutch 42 transmits and interrupts the power to the second shifting part.

The first shift clutch 41 is positioned to be closer to the front case half body 2a than the centrifugal clutch C adjacent the centrifugal clutch C in the axial direction. The first shift clutch 41 is spline fitted in the front coupling part 26a on the input side of the power of the internal combustion engine E transmitted via the centrifugal clutch C and the primary speed reduction mechanism R to be integrally rotatably coupled thereto, and is spline fitted in the outer shaft part 31b on the output side of the power to the first main shaft 31 to be integrally rotatably coupled thereto.

The second shift clutch 42 arranged on the opposite side of the first shift clutch 41 across the driven gear 26 in the axial direction is spline fitted in the rear coupling part 26b on the input side of the power of the internal combustion engine E transmitted via the centrifugal clutch C and the primary speed reduction mechanism R to be integrally rotatably coupled thereto, and is spline fitted in a front shaft end 32a protruded forward from the bearing 35 to be extended in the front housing 12 on the output side of the power to the second main shaft 32 and to be integrally rotatably coupled thereto.

Both the shift clutches 41 and 42 are hydraulic clutches of a multiple disc friction type of the same construction and each have a bowl-like clutch outer 60 as an input member spline fitted in the outer periphery of the front coupling part 26a or the rear coupling part 26b to be integrally rotatably disposed thereon, plural clutch plates 62 integrally rotatably engaged with the clutch outer 60, plural second clutch plates 63 stacked alternately with the first clutch plates 62, a clutch inner 61 as an output member integrally rotatably engaged with the second clutch plates 63, and a piston 64 slidably fitted in the clutch outer 60 such that the first clutch plates 62 and the second clutch plates 63 are press-contacted with each other.

The shift clutches 41 and 42 are formed with hydraulic chambers 65 and 66 by the clutch outers 60 and the pistons 64. The hydraulic chamber 65 of the first shift clutch 41 is arranged to be closer to the second shift clutch 42 in the axial direction. The hydraulic chamber 66 of the second shift clutch 42 is arranged to be closer to the first shift clutch 41 in the axial direction. The first shift clutch 41 and the second shift clutch 42 are arranged back to back so that the hydraulic chamber 65 and the hydraulic chamber 66 are close to each other in the axial direction. The oil pressure of the hydraulic chambers 65 and 66 is controlled by supplying and discharging working fluid to/from the hydraulic chambers 65 and 66 through oil paths 67 and 68 disposed in the front cover 10 and the front extension part Sa. When the oil pressure of the hydraulic chambers 65 and 66 is high, the piston presses the first clutch plates and the second clutch plates against a resilient force of a return spring 69 so that the power transmission system is changed into the connected state in which the clutch outers 60 and the clutch inners 61 are integrally rotated by friction between both the clutch plates. When the oil pressure of the hydraulic chambers 65 and 66 is low, both the clutch plates 62 and 63 are separated from each other by a resilient force of the return spring 69 so that the power transmission system is changed into the disconnected state in which transmission of the power is interrupted between the clutch outers 60 and the clutch inners 61.

The pressure of the working fluid of the hydraulic chambers 65 and 66 is controlled by a hydraulic controller. The hydraulic controller has a control valve unit 71 controlling the discharge pressure of the hydraulic pump to control the oil pressure of the hydraulic chambers 65 and 66 using a hydraulic pump driven by the crankshaft 5 as a hydraulic source. The control valve unit 71 has a valve housing 71a (see FIG. 1) attached to the front cover 10, and plural hydraulic control valves housed in the valve housing 71a. The hydraulic control valves are controlled by the electronic controlled unit 70. Supply and discharge of the working fluids to/from the hydraulic chambers 65 and 66 through the oil paths 67 and 68 disposed on the first main shaft 31 are controlled. Disconnection or connection of the shift clutches 41 and 42, that is, the intermittent state is controlled.

In the first shift clutch 41, the power from the primary speed reduction mechanism R is transmitted to the clutch outer 60. The clutch inner 61 transmits the power to the first main shaft 31. In the second shift clutch 42, the power from the primary speed reduction mechanism R is transmitted to the clutch outer 60. The clutch inner 61 transmits the power to the second main shaft 32.

The first shift clutch 41 and the second shift clutch 42 are arranged between the front case half body 2a and the centrifugal clutch C in the axial direction. A coupling part 22a of the clutch outer 22 of the centrifugal clutch C to the driving gear 25 is overlapped with almost the entire second shift clutch 42. The clutch inner 61 of the second shift clutch 42 is arranged near the front case half body 2a in the axial direction to be contacted with the bearing 35 in the axial direction. The clutch outers 60 as members close to the driven gear 26 in the first shift clutch 41 and the second shift clutch 42 are positioned near the disc part 26c of the driven gear 26 in the axial direction.

Referring to FIG. 1, the first shift clutch 41 and the second shift clutch 42 are arranged in positions overlapped with the centrifugal clutch C, seen in the axially direction. The clutch outer 60 as a member having the largest outer diameter in the second shift clutch 42 in the diameter direction of the front extension part 5a is positioned near the coupling part 22a. The clutch outer 22 as a member having the largest outer diameter in the centrifugal clutch C is positioned near the outer shaft part 31b. The clutch outer 22 of the centrifugal clutch C is in a position overlapped with the inner periphery part of the clutch outer 60 or the inner periphery part of the piston 64 in the diameter direction, seen in the axially direction.

Figure 4:
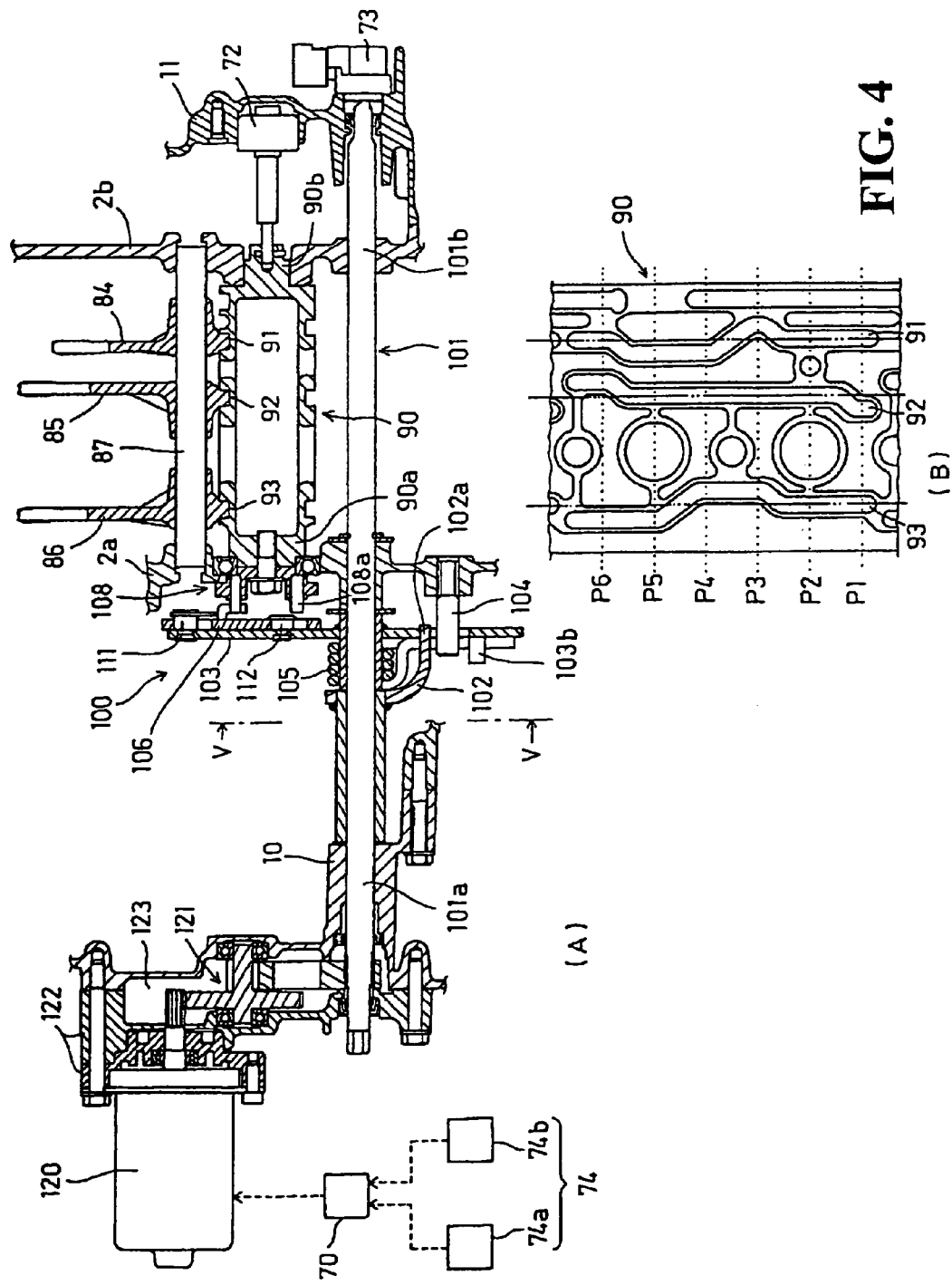
FIG. 4(A) is a schematic cross-sectional view taken along line IV-IV of FIG. 1.
FIG. 4(B) is a developed view showing cam grooves of a shift drum of the transmission.

Referring to FIGS. 2 to 4, the selection mechanism M2 has plural, here, three shifters 81 to 83 movable in the axial direction on the main shaft 30 or the counter shaft 33 in order to change the gear trains G1 to G5 and GR into the connected state integrally rotatable with the main shaft 30 or the counter shaft 33 or into the disconnected state relatively rotatable therewith for the purpose of selecting gear steps, a predetermined plural number (equal to that of the shifters 81 to 83) of, here, three shift forks 84 to 86 slidably supported in the axial direction by a support shaft 87 supported by the front case half body 2a and the rear case half body 2b in order to move the shifters 81 to 83, one shift drum 90 in which cam grooves 91 to 93 as guide parts guiding and moving the shifters 81 to 83 by guiding and moving the shift forks 84 to 86 in the axial direction are disposed on its outer periphery surface, an intermittent feeding mechanism 100 intermittently rotating the shift drum 90, and a reversely rotatable electric motor 120 as one actuator as driving means operating the intermittent feeding mechanism 100 based on an instruction from the electronic controlled unit 70.

The three shifters 81 to 83 having protrusions engageable with the gears constructing the gear trains G1 to G5 and GR are the first shifter 81 for shifting of the first speed and the third speed, the second shifter 82 for shifting of the fifth speed and the rearward speed, and the third shifter 83 for shifting the second speed and the fourth speed. The shift forks 84 to 86 have the first shift fork 84 engaged with the first shifter 81, the second shift fork 85 engaged with the second shifter 82, and the third shift fork 86 engaged with the third shifter 83. The shifters 81 to 83 corresponding to the shift forks 84 to 86 guided and moved by the cam grooves 91 to 93 in accordance with rotation of the shift drum 90 are moved to selection positions realizing the connected state and the neutral position realizing the disconnected state.

The first shifter 81 is constructed of the driving gear 47 serving as a shifter and is spline fitted in the inner shaft part 31*a* between the driving gear 43 and the driving gear 45 to be movable in the axial direction. The driving gear 47 (the first shifter 81) is moved rearward to a selection position to be engaged with the driving gear 43 for selecting the first speed gear train G1 (the first speed gear step). The driving gear 47 (the first shifter 81) is moved forward to another selection position to be engaged with the driving gear 45 for selecting the third speed gear train G3 (the third speed gear step).

The second shifter 82 is constructed of the driven gear 55 serving as a shifter and is spline fitted in the counter shaft 33 between the driven gear 57 and the driven gear 58 to be movable in the axial direction. The driven gear 55 (the second shifter 82) is moved rearward to a selection position to be engaged with the driven gear 57 for selecting the fifth speed gear train G5 (the fifth speed gear step). The driven gear 55 (the second shifter 82) is moved forward to another selection position to be engaged with the driven gear 58 for establishing the rearward gear train GR as a gear train when the vehicle is moved rearward.

The third shifter 83 is spline fitted in the counter shaft 33 between the driven gear 54 and the driven gear 56 to be movable in the axial direction. The third shifters 81, 82, and 83 are engaged with the driven gear for establishing the second speed gear train G2. They are moved forward to another selection position to be engaged with the driven gear for selecting the fourth speed gear train G4 (the fourth speed gear step).

When the shifters 81 to 83 occupy the neutral position, none of the gear trains G1 to G5 and GR (gear steps) is selected.

The shift drum 90 having a rotation center line in parallel with the rotation center lines L1 to L3 is rotatably supported by the front case half body 2*a* via a bearing 94 at a front end 90*a* and is rotatably supported by the rear case half body 2*b* at a rear end 90*b*. The shift forks 84 to 86 are guided by the cam grooves 91 to 93 to be moved in the axial direction in accordance with rotation of the shift drum 90 rotated by the intermittent feeding mechanism 100 coupled to the front end 90*a*. The gear trains G1 to G5 and GR can be then selected. As shown in FIG. 4(B), the shift drum 90 normally rotated and reversely rotated by being rotatably driven by the electric motor 120 occupies plural, here, six predetermined rotation positions P1 to P6 setting the shifting position of the transmission M. The predetermined rotation positions P1 to P6 are set by the later-described intermittent feeding mechanism 100 as a positioning mechanism of the shift drum 90. The predetermined rotation positions P1 to P6 are detected by a rotation position detector 72 constructed of a potentiometer. A rotation position detector 95 is attached to the rear cover 11 to be connected to the rear end of the shift drum 90.

Figure 5A:
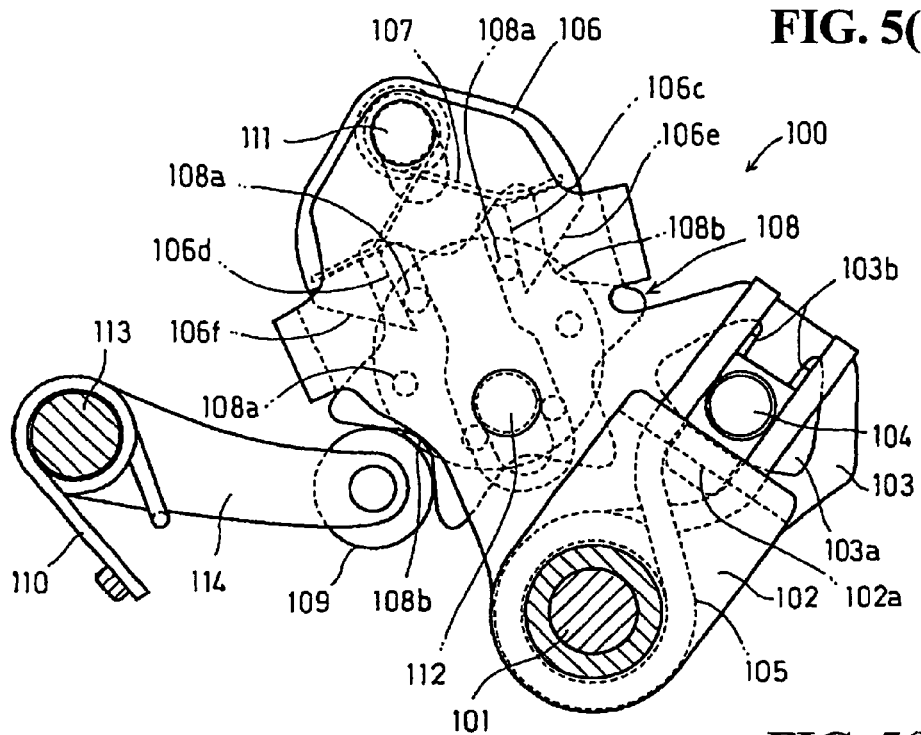
FIG. 5(A) is a cross-sectional view taken along line V-V of FIG. 4(A)
Figure 5B:
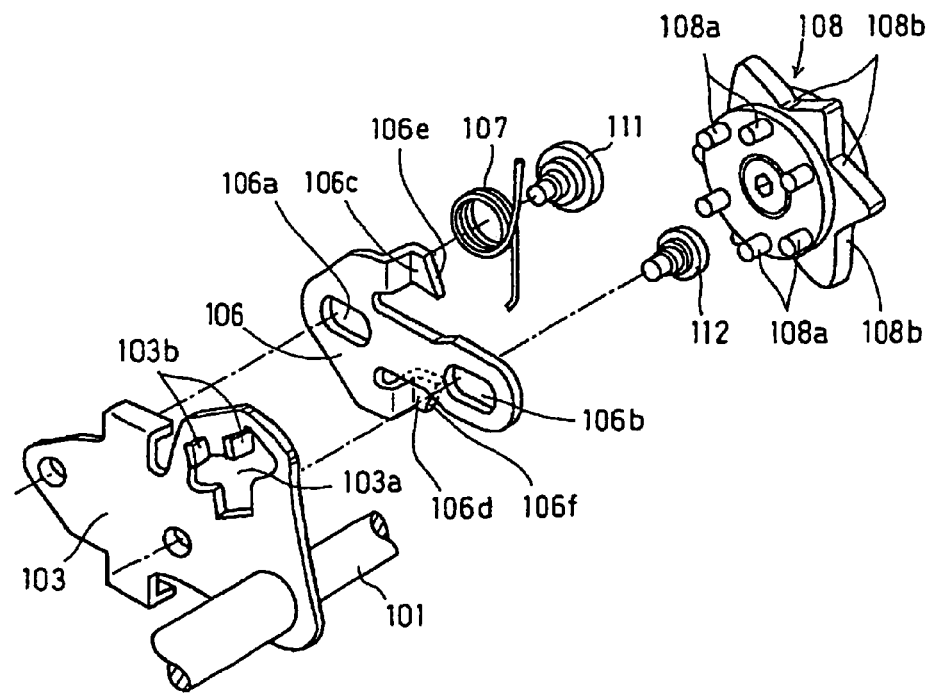
FIG. 5(B) is an exploded perspective view of an essential part of a selection mechanism of the transmission.

Referring to FIGS. 4 and 5, the intermittent feeding mechanism 100 has a shift spindle 101 rotatably driven by the electric motor 120, an arm 102 fixed to the shift spindle 101, a change arm 103 relatively rotatably supporting the shift spindle 101, a regulation pin 104 fixed to the front case half body 2*a* to be inserted into the change arm 103, a return spring 105 returning the change arm 103 to the neutral position, a shifter plate 106 supported by the change arm 103 so as to be relatively moved between it and the change arm 103 in the diameter direction of the shift spindle 101, a spring 107 exerting the shifter plate 106 inward in the diameter direction, a pin plate 108 fixed to the front end 90*a* of the shift drum 90 opposite the shifter plate 106 in the direction of the rotation center line of the shift drum 90 and provided with plural feeding pins 108*a*, and a roller 109 exerted by a spring 110 in the direction brought into contact with the outer periphery of the pin plate 108.

The shift spindle 101 rotatably extended through both the case half bodies 2*a* and 2*b* in the front and rear directions is rotatably supported by the front cover 10 at a front end 101*a* protruded forward from the front case half body 2*a* and is rotatably supported by the rear case half body 2*b* at a rear end 101*b*.

The change arm 103 is provided with a spring receiving part 103*b* formed by folding part of the change arm 103 at a front end 102*a* of the arm 102 and an edge defining an opening 103*a* into which the regulation pin 104 is inserted. When the change arm 103 is in the neutral position, both ends of the return spring 105 play fitted in the shift spindle 101 are brought into contact with both sides of the spring receiving part 103*b*.

In the state that the change arm 103 is in the neutral position, the shift spindle 101 rotated in any one of the normal and reverse directions rotates the change arm 103 in any one of the normal and reverse directions against the return spring 105 until the front end 102*a* of the arm 102 bends the return spring 105 to be brought into contact with one side edge of the opening 103*a*. The change arm 103 is rotated until the edge of the opening 103*a* is brought into contact with the regulation pin 104.

Guide pins 111 and 112 inserted into and engaged with elongate holes 106*a* and 106*b* provided in the shifter plate 106 are fixed to the change arm 103 by caulking. The shifter plate 106 can be slid to the change arm 103 along the diameter direction of the shift spindle 101.

The shifter plate 106 is provided with feed pawls 106*c* and 106*d* folded to the shift drum 90 side. The feed pawls 106*c* and 106*d* are formed outside with cams 106*e* and 106*f*. Six feed pins 108*a* are disposed so that two feed pins 108*a* are arranged between both the feed pawls 106*c* and 106*d*. The pin plate 108 is formed in the outer periphery with six concave portions 108*b* at an equal pitch in the periphery direction. The roller 109 is axially supported by an arm 114 in which one end is slidably supported by the front case half body 2*a* via a support shaft 113.

In the selection mechanism M2, rotation of the change arm 103 in any one of the normal and reverse directions in accordance with rotation of the shift spindle 101 in any one of the normal and reverse directions engages one of both the feed pawls 106*c* and 106*d* of the shifter plate 106 with one of the feed pins 108*a* of the pin plate 108 and the shift drum 90 is intermittently rotated in any one of the normal and reverse directions. When the change arm 103 is returned to the neutral position by a spring force of the return spring 105, one of the feed pins 108a of the pin plate 108 is brought into contact with one of the cams 106e and 106f of both the feed pawls 106c and 106d of the shifter plate 106. The shifter plate 106 is moved outward in the diameter direction of the shift spindle 101 against a spring force of the spring 107. One of both the feed pawls 106c and 106d passes over one of the feed pins 108a. The rotation position of the pin plate 108 is held by engaging the roller 109 with one of the concave portions 108b of the pin plate 108. The shift drum 90 occupies the predetermined rotation positions P1 to P6 and is stopped corresponding to the concave portion 108b with which the shift drum 90 is engaged.

The front end 101a of the shift spindle 101 is coupled to the electric motor 120 via a speed reduction gear train 121. The electric motor 120 is attached to a gear case 122. The speed reduction gear train 121 is housed in a gear case 123 formed between the front cover 10 and the gear case 121. A rotation position detector 124 constructed of a potentiometer detecting the rotation position of the shift spindle 101 is attached to the rear cover 11.

A signal from driving state detection means 74 and both rotation position detectors 72 and 73 detecting the driving state of the internal combustion engine E and the vehicle is inputted to the electronic controlled unit 70 controlling the intermittent state of the first shift clutch 41 and the second shift clutch 42 and the rotation amount and the rotation direction of the electric motor 120. The driving state detection means 74 has vehicle velocity detection means 74a and accelerator opening detection means 74b detecting a load of the internal combustion engine E. The electronic controlled unit 70 rotatably drives the shift spindle 101 based on the signal from the driving state detection means 74 to automatically control the shifting position of the transmission M in accordance with the driving state. The electronic controlled unit 70 feedback controls the rotation position of the shift spindle 101 based on the rotation position detected by the rotation position detector 73 and can control with high accuracy the rotational speed of the shift spindle 101 changed in accordance with the rotation position.

As an option device for controlling the shifting position of the transmission M, a shift switch having a shift up switch and a shift down switch disposed on the handlebar of the vehicle may be provided as a shifting operation part to which a shifting position instructed by the rider is inputted. In this case, the electronic controlled unit 70 to which a signal from the shift switch is inputted controls operation of the electric motor 120 in accordance with the signal from the shift switch and controls rotation of the shift drum 90 via the shift spindle 101 and the intermittent feeding mechanism 100.

Referring to FIGS. 3 and 4, establishment of the running gear steps in the cam grooves 91 to 93 and the transmission M will be focusably described.

The cam grooves 91 to 93 equal in number to that of the shifters 81 to 83 and the shift forks 84 to 86 are the first cam groove 91 guiding the first shift fork 84, the second cam groove 92 guiding the second shift fork 85, and the third cam groove 93 guiding the third shift fork 86. The cam grooves 91 to 93 guide the corresponding shifters 81 to 83 via the shift forks 84 to 86 to move them in the axial direction and can select, corresponding to the predetermined rotation positions P1 to P6, the shifting positions of the transmission M, that is, plural shifting positions when the vehicle is moved forward, here, the first speed position to the fifth speed position, the rearward position when the vehicle is moved rearward, and the neutral position.

When in accordance with the signal from the driving state detection means 74, the shift drum 90 is rotated in the normal direction or the reverse direction by being automatically driven by the electric motor 120 via the intermittent feeding mechanism 100, in the range of the predetermined rotation positions P1 to P6, the first cam groove 91 guides the first shift fork 84 in the first shifting part so that the driving gear 47 (the first shifter 81) selects the first speed gear step and the third speed gear step, the second cam groove 92 guides the second shift fork 85 in the first shifting part so that the driving gear 55 (the second shifter 82) selects the fifth speed gear step and the rearward gear step, and the third cam groove 93 guides the third shift fork 86 in the second shifting part so that the third shifter 83 selects the second speed gear step and the fourth speed gear step.

More specifically, this will be as follows.

When the shift drum 90 is in the predetermined rotation position P2 in the neutral position of the transmission M, the first shifter 81 to the third shifter 83 are in the neutral position. From this state, in the rotation direction of the shift drum 90 at shift up, the cam grooves 91 to 93 guide the shift forks 84 to 86, that is, the shifters 81 to 83 so that the shifters 81 to 83 sequentially occupy the positions explained next.

When the shift drum 90 occupies the predetermined rotation position. P3, in the first shifting part, the first cam groove 91 guides the first shifter 81 to the selection position selecting the first speed gear step and the second cam groove 92 guides the second shifter 82 to the neutral position, and, in the second shifting part, the third cam groove 93 guides the third shifter 83 to the selection position selecting the second speed gear step.

When the shift drum 90 occupies the predetermined rotation position P4, in the first shifting part, the first cam groove 91 guides the first shifter 81 to the selection position selecting the third speed gear step and the second cam groove 92 guides the second shifter 82 to the neutral position, and, in the second shifting part, as in the predetermined rotation position P3, the third cam groove 93 guides the third shifter 83 to the selection position selecting the second speed gear step.

When the shift drum 90 occupies the predetermined rotation position P5, in the first shifting part, as in the predetermined rotation position P4, the first cam groove 91 guides the first shifter 83 to the selection position selecting the third speed gear step and the second cam groove 92 guides the second shifter 82 to the neutral position, and, in the second shifting part, the third cam groove 93 guides the third shifter 83 to the selection position selecting the fourth speed gear step.

When the shift drum 90 occupies the predetermined rotation position P6, in the first shifting part, the first cam groove 91 guides the first shifter 81 to the neutral position and the second cam groove 92 guides the second shifter 82 to the selection position selecting the fifth speed gear step, and, in the second shifting part, as in the predetermined rotation position P5, the third cam groove 93 guides the third shifter 83 to the selection position selecting the fourth speed gear step.

At shift down, the shift drum 90 is rotated in the reverse direction and occupies the shifting position in the reverse order of the foregoing.

When the shift drum 90 is rotated from the predetermined rotation position P2 in the rotation direction at shift down to occupy the predetermined rotation position P1, in the first shifting part, the first cam groove 91 guides the first shifter 81 to the neutral position and the second cam groove 92 guides the second shifter 82 to the selection position selecting the rearward gear step, and, in the second shifting part, the third cam groove 93 guides the third shifter 83 to the neutral position. This establishes the rearward gear step as the running gear step when the vehicle is moved rearward.

In the forward shifting position, the cam grooves 91 to 93 guide the shifters 81 to 83 to the selection positions in which the different gear steps are selected one by one at the same time in the first gear step and the second shifting part for each of the predetermined rotation positions P3 to P6 of the shift drum 90. In the predetermined rotation positions P3 to P6, the gear steps selected in the first shifting part and the second shifting part are two consecutive gear steps in plural, here, five gear steps, obtained by the transmission M when the vehicle is moved forward.

In the first shifting part, when the second shifter 82 is in the neutral position in the two predetermined rotation positions P4 and P5, the first shifter 81 occupies the selection position engaged with the driving gear 45 of the third speed gear train G3 and the third speed gear train G3 using the driven gear 55 constructing the second shifter 82 as a construction gear selects the third speed gear step and, when the first shifter 81 is in the neutral position in the predetermined rotation position P6, the second shifter 82 occupies the selection position engaged with the driven gear 57 of the fifth speed gear train G5 and the fifth speed gear train G5 using the driving gear 47 constructing the first shifter 81 as a construction gear selects the fifth speed gear step.

When the shift drum 90 is in the predetermined rotation positions P3 to P6, the first shift clutch 41 and the second shift clutch 42 are controlled by the electronic controlled unit 70 corresponding to the shifting position (that is, the running gear step) set based on the driving state detection means 74 and are automatically operated so as to transmit the power to one of the first main shaft 31 and the second main shaft 32 and to interrupt the power to the other shaft for establishing the running gear step in the transmission M. The power shifted at the running gear step is transmitted via the drive axle D to the wheels.

In the predetermined rotation position P3, the first shift clutch 41 transmits the power from the centrifugal clutch C to the first main shaft 31 and the second shift clutch 42 interrupts the power to the second main shaft 32 so that the first gear step is established as the running gear step. When the second gear step is established as the running gear step by the shift up operation, the second shift clutch 42 may be changed into the connected state and the first shift clutch 41 may be changed into the disconnected state. Shifting from the first speed gear step to the second speed gear step (that is, shifting of the gear steps) and shifting from the second gear step to the first speed gear step are enabled rapidly with a small shift shock. In the same manner, in the predetermined rotation positions P4 to P6, rapid shifting is enabled at shift up and shift down between the second speed gear step and the third speed gear step, between the third speed gear step and the fourth speed gear step, and between the fourth speed gear step and the fifth speed gear step.

The cam grooves 91 to 93 guide the shifters 81 to 83 to the selection positions in the first shifting part and the second shifting part so that the second speed gear step and the third speed gear step of the first speed gear step, the second speed gear step, and the third speed gear step as the three consecutive gear steps from the low speed side are selected in the adjacent two predetermined rotation positions of the shift drum 90.

For instance, the second speed gear step and the third speed gear step of the second speed gear step to the fourth speed gear step as the three consecutive gear steps from the low speed side are selected in the adjacent two predetermined rotation positions P3 and P4 and the adjacent two predetermined rotation positions P4 and P5 of the shift drum 90 by the third shifter 83 and the first shifter 81 guided by the third cam groove 93 and the first cam groove 91. In the same manner, the third speed gear step and the fourth speed gear step of the third speed gear step to the fifth speed gear step as the three consecutive gear steps from the low speed side are selected in the adjacent two predetermined rotation positions P4 and P5 and the adjacent two predetermined rotation positions P5 and P6 of the shift drum 90 by the first shifter 81 and the third shifter 83 guided by the first cam groove 91 and the third cam groove 93.

Shifting between the third speed gear step and the second speed gear step and the fourth speed gear step as the gear steps interposing the third speed gear step therebetween when the use frequency at the third gear step is high, and shifting between the fourth speed gear step and the third speed gear step and the fifth speed gear step as the gear steps interposing the fourth speed gear step therebetween when the use frequency at the fourth speed gear step is high are done rapidly with a small shock by shifting the first shift clutch 41 and the second shift clutch 42.

The operation and effect of the embodiment constructed above will be described.

The transmission M of the vehicular power transmission system includes the centrifugal clutch C having the clutch shoe 23 controlling the intermittent state by a centrifugal force in accordance with an engine rotational speed as a start clutch transmitting and interrupting the power of the internal combustion engine E from the crankshaft 5 to the first shift clutch 41 and the second shift clutch 42. The power of the internal combustion engine E is transmitted to the first shift clutch 41 and the second shift clutch 42 and to the first shifting part and the second shifting part via the centrifugal clutch C changed from the disconnected state through the partial clutch engagement state to the connected state since the intermittent state is controlled by the clutch shoe 23 operated by the operation of the centrifugal force. As a result, the centrifugal force C excellent in efficiency of power transmission at relatively low cost is used as the start clutch. The vehicular power transmission system in which the first shift clutch 41 and the second shift clutch 42 to which the power of the internal combustion engine E is transmitted shift the gear steps is excellent in efficiency of power transmission and durability, and can be manufactured at low cost and relieve a start shock.

The centrifugal clutch C is disposed on the crankshaft 5. The first shift clutch 41 and the second shift clutch 42 are disposed on the main shaft 30 of the transmission M arranged in parallel with the crankshaft 5 and are arranged in positions overlapped with the centrifugal clutch C, seen in the axial direction of the main shaft 30. The centrifugal clutch C having a relatively large diameter and the first shift clutch 41 and the second shift clutch 42 are arranged to be overlapped with each other, seen in the axial direction. The axle base between the crankshaft 5 and the main shaft 30 can be smaller. The crankshaft 5 of the internal combustion engine E and the main shaft 30 of the transmission M can be arranged to be compact. The power unit having the internal combustion engine E and the transmission M can be compact.

The first shift clutch 41 and the second shift clutch 42 are arranged between the front case half body 2a of the crankcase 2 rotatably supporting the main shaft 30 and the centrifugal clutch C in the axial direction. The first shift clutch 41 and the second shift clutch 42 having a relatively large weight can be arranged to be closer to the crankcase 2 than the centrifugal clutch C. The center of gravity of heavy parts such as the first shift clutch 41 and the second shift clutch 42 can be close to the crankcase 2 as a supporting member. The first main shaft 31 of the main shaft 30 requiring strength for disposition of the first shift clutch 41 and the second shift clutch 42 is shortened for weight reduction.

The first shift clutch 41 and the second shift clutch 42 constructed of hydraulic clutches provided with the hydraulic chambers 65 and 66 are arranged back to back so that the hydraulic chamber 65 of the first shift clutch 41 and the hydraulic chamber 66 of the second shift clutch 42 are close to each other in the axial direction. The difference in length between the oil paths 67 and 68 guiding working fluid to the hydraulic chambers 65 and 66 can be smaller in the first shift clutch 41 and the second shift clutch 42, contributing to making the operating response of the first shift clutch 41 and the second shift clutch 42 uniform to improve the shift feeling.

The driven gear 26 transmitting the power from the centrifugal clutch C to the first shift clutch 41 and the second shift clutch 42 is arranged between the first shift clutch 41 and the second shift clutch 42 in the axial direction. The transmission path lengths of the power from the centrifugal clutch C to the first shift clutch 41 and the second shift clutch 42 can be equal. The equal power is transmitted to the first shift clutch 41 and the second shift clutch 42, contributing to making the operating response of the first shift clutch 41 and the second shift clutch 42 uniform to improve the shift feeling.

In the transmission M in which the selection mechanism M2 thereof has one shift drum 90 rotated based on the shifting operation, and the shifters 81 to 83 guided and moved by the cam grooves 91 to 93 disposed on the shift drum 90 in accordance with rotation of the shift drum 90, the shifters 81 to 83 being movable to the selection positions and the neutral position in the first shifting part and the second shifting part, the cam grooves 91 to 93 guiding the shifters 81 to 83 to the selection positions in the first shifting part and the second shifting part with respect to one of the predetermined rotation positions P3 to P6 of the shift drum 90, so that the first shift clutch 41 and the second shift clutch 42 transmitting and interrupting the power of the internal combustion engine E to the first shifting part and the second shifting part setting the gear steps shift the gear steps, one shift drum 90 can select the gear steps in the first shifting part and the second shifting part at the same time. Plural shift drums are unnecessary. One driving means driving the shift drum 90 is required. Shifting at the selected two gear steps can be done only by shifting the transmission paths of the power by the first shift clutch 41 and the second shift clutch 42. As a result, the gear steps in the first shifting part and the second shifting part are selected by one shift drum 90. The number of parts can be reduced. The transmission M which can be compact and is inexpensive can be obtained.

The first shifting part includes the fifth speed gear train G5 as the first gear train and the third speed gear train G3 as the second gear train which set the gear steps. The cam grooves 91 and 92 guide the first shifter 81 and the second shifter 82 so that when the driving gear 47 (the first shifter 81) is in the neutral position and the driven gear 55 (the second shifter 82) is in the selection position engaged with the driven gear 57, the fifth speed gear step of the fifth speed gear train G5 is selected and, when the driven gear 55 (the second shifter 82) is in the neutral position and the driving gear 47 (the first shifter 81) is in the selection position engaged with the driving gear 45, the third speed gear step of the third speed gear train G3 is selected. The driving gear 47 and the driven gear 55 as components of the fifth speed gear train and the third speed gear train which set the gear steps in the first shifting part serve as the first shifter 81 and the second shifter 82. A shifter different from the gear train need not be disposed between the gear trains. As a result, the fifth speed gear train G5 and the third speed gear train G3 serve as the first shifter 81 and the second shifter 82. The shift drum 90 can be compact in the axial direction. The width of the crankcase 2 housing the shift drum 90 can be smaller in the axial direction. The transmission M becomes compact in the axial direction.

The first main shaft 31 defining the shaft length of the main shaft 30 and provided with the first shifting part is longer than the second main shaft 32 provided with the second shifting part. In the main shaft 30, in the first shifting part disposed on the first main shaft 31, the fifth speed gear train and the third speed gear train serve as the first shifter 81, the second shifter 82, and 83. The first main shaft 31 longer than the second main shaft 32 can be shorter. The transmission M becomes compact in the axial direction.

The selection mechanism M2 has one electric motor 120, the shift spindle 101 rotatably driven by the electric motor 120, and the intermittent feeding mechanism 100 intermittently rotating the shift drum 90 in accordance with rotation of the shift spindle 101 and can directly use the shift spindle 101 and the intermittent feeding mechanism 100 which have been used for the manual selection mechanism. As a result, automation of the selection mechanism M2 by employing the electric motor 120 can be done at low cost. When the transmission M is used as a motorcycle including the saddle-ride type ATV (All Terrain Vehicle), the shift drum 90 and the shift spindle 101 can be arranged in the same position as that of the shifting mechanism (gear change mechanism) by feet in the related art. The transmission M can be mounted as the power unit of the vehicle with an automatic transmission without greatly changing the construction of the vehicle with a manual transmission.

By the shifters 81 and 83 guided by the cam grooves 91 and 93, the second speed gear step and the third speed gear step of the second speed gear step to the fourth speed gear step as the three consecutive gear steps from the low speed side are selected in the adjacent two predetermined rotation positions P3 and P4 and the adjacent two predetermined rotation positions P4 and P5 of the shift drum 90 by the third shifter 83 and the first shifter 81 guided by the third cam groove 93 and the first cam groove 91. In the same manner, the third speed gear step and the fourth speed gear step of the third speed gear step to the fifth speed gear step as the three consecutive gear steps from the low speed side are selected in the adjacent two predetermined rotation positions P4 and P5 and the adjacent two predetermined rotation positions P5 and P6 of the shift drum 90 by the first shifter 81 and the third shifter 83 guided by the first cam groove 91 and the third cam groove 83. Shifting between the third speed gear step and the second speed gear step and the fourth speed gear step interposing the third speed gear step therebetween is done by shifting the first shift clutch 41 and the second shift clutch 42. In the same manner, shifting between the fourth speed gear step and the third speed gear step and the fifth speed gear step interposing the fourth speed gear step therebetween is done by shifting the first shift clutch 41 and the second shift clutch 42. As a result, the first clutch 41 and the second clutch 42 are shifted without rotating the shift drum 90 at shifting to be shifted to the adjacent gear steps. Smooth acceleration and deceleration and shifting with a small shock can be done to improve the ride comfort.

Of the centrifugal clutch C having a relatively large diameter, the first shift clutch 41, the second shift clutch 42, and the driven gear 26, the start clutch required to be maintained at a relatively high frequency, that is, the centrifugal clutch C is arranged in the forefront position in the front housing 12 or in the closest position to the front cover 10 in the axial direction. The maintenance operation becomes easy.

The clutches of the same construction are used for the first shift clutch 41 and the second shift clutch 42 for reducing the cost. The damper is incorporated into the driven gear 26. The driven gear 26, the clutch outers 60 of both the shift clutches 41 and 42, and the damper are rotated together regardless of the intermittent state of the first shift clutch 41 and the second shift clutch 42. The driven gear 26, the clutch outers 60 of both the shift clutches 41 and 42, and the damper are integrated. The vehicle power transmission system can be compact and lightweight.

Modified constructions of an embodiment which has modified some constructions of the above-described embodiment will be described below.

The internal combustion engine may be a multi-cylinder internal combustion engine. The engine may be an internal combustion engine or a prime mover other than the internal combustion engine having a reciprocating piston.

The guiding parts of the shift drum may be guiding parts, e.g., convex threads other than the cam grooves.

The selection means may be of a manual type one rotatably driven by the direct operation of the rider.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission, comprising:
   a first shifting part;
   a second shifting part, said first and second shifting parts for shifting power of an engine;
   a first shift clutch for transmitting and interrupting the power to the first shifting part;
   a second shift clutch for transmitting and interrupting the power to the second shifting part; and
   a selection mechanism that selects gear steps in the first shifting part and the second shifting part, the first shift clutch and the second shift clutch shifting gear steps of the first shifting part and gear steps of the second shifting part, respectively,
   wherein the selection mechanism includes a shift drum that is rotated based on a shifting operation and shifters that are guided and moved by guide portions disposed on the shift drum in accordance with rotation of the shift drum, the shifters being movable to selection positions where the gear steps are selected and to neutral positions where the gear steps are not selected in the first shifting part and the second shifting part, and the guide portions guide the shifters to the selection positions in the first shifting part and the second shifting part with respect to one of predetermined rotational positions of the shift drum.

2. The transmission according to claim 1, wherein the first shifting part includes a first shift element and a second shift element each setting the gear steps, the shifters include a first shifter that is configured by the first shift element and that moves in the axial direction of the shift drum and a second shifter that is configured by the second shift element and that moves in the axial direction of the shift drum, and the guide portions guide the first and second shifters in such a manner that the gear step is selected by the first shift element when the first shifter is in the neutral position and the second shifter is in the selection position, and the gear step is selected by the second shift element when the second shifter is in the neutral position and the first shifter is in the selection position.

3. The transmission according to claim 2, further comprising an input shaft including a first input shaft and a second input shaft to which the power is transmitted, the first input shaft which specifies the length of the input shaft and on which the first shift part is provided being longer than the second input shaft on which the second shift part is provided.

4. The transmission according to claim 1, wherein the selection mechanism includes one electric motor and a shift spindle that is driven for rotation by the electric motor to rotate the shift drum.

5. The transmission according to claim 2, wherein the selection mechanism includes one electric motor and a shift spindle that is driven for rotation by the electric motor to rotate the shift drum.

6. The transmission according to claim 3, wherein the selection mechanism includes one electric motor and a shift spindle that is driven for rotation by the electric motor to rotate the shift drum.

7. The transmission according to claim 4, wherein the selection mechanism includes an intermittent feeding mechanism that allows the shift drum to intermittently rotate in accordance with the rotation of the shift spindle.

8. The transmission according to claim 5, wherein the selection mechanism includes an intermittent feeding mechanism that allows the shift drum to intermittently rotate in accordance with the rotation of the shift spindle.

9. The transmission according to claim 6, wherein the selection mechanism includes an intermittent feeding mechanism that allows the shift drum to intermittently rotate in accordance with the rotation of the shift spindle.

10. The transmission according to claim 1, wherein the guide portions guide the shifters to the selection positions in the first shifting part and the second shifting part so that the first speed gear step and the second speed gear step of the first speed gear step, the second speed gear step, and the third speed gear step as the three consecutive gear steps from the low speed side are selected in the adjacent two predetermined rotation positions of the shift drum.

11. A transmission, comprising:
    a first plurality of gear trains;
    a second plurality of gear trains, said first and second plurality of gear trains for transmitting power of an engine at a predetermined gear ratio to a drive axle;
    a first shift clutch for transmitting and interrupting the power to the first plurality of gear trains;
    a second shift clutch for transmitting and interrupting the power to the second plurality of gear trains; and
    a selection mechanism that selects gear trains of the first and second plurality of gear trains,
    wherein the selection mechanism includes a shift drum that is rotated based on a shifting operation and shifters that are guided and moved by guide portions disposed on the shift drum in accordance with rotation of the shift drum, the shifters being movable to selection positions where the gear trains are selected and to neutral positions where the gear trains are not selected, and the guide portions guide the shifters to the selection positions depending on the rotational position of the shift drum.

12. The transmission according to claim 11, wherein the first shifting part includes a first shift element and a second shift element each setting the gear trains, the shifters include a first shifter that is configured by the first shift element and that moves in the axial direction of the shift drum and a second shifter that is configured by the second shift element and that moves in the axial direction of the shift drum, and the guide portions guide the first and second shifters in such a manner that the gear train is selected by the first shift element when the first shifter is in the neutral position and the second shifter is in the selection position, and the gear train is selected by the second shift element when the second shifter is in the neutral position and the first shifter is in the selection position.

13. The transmission according to claim 12, further comprising an input shaft including a first input shaft and a second input shaft to which the power is transmitted, the first input shaft which specifies the length of the input shaft and on which the first shift part is provided being longer than the second input shaft on which the second shift part is provided.

14. The transmission according to claim 11, wherein the selection mechanism includes one electric motor and a shift spindle that is driven for rotation by the electric motor to rotate the shift drum.

15. The transmission according to claim 12, wherein the selection mechanism includes one electric motor and a shift spindle that is driven for rotation by the electric motor to rotate the shift drum.

16. The transmission according to claim 13, wherein the selection mechanism includes one electric motor and a shift spindle that is driven for rotation by the electric motor to rotate the shift drum.

17. The transmission according to claim 14, wherein the selection mechanism includes an intermittent feeding mechanism that allows the shift drum to intermittently rotate in accordance with the rotation of the shift spindle.

18. The transmission according to claim 15, wherein the selection mechanism includes an intermittent feeding mechanism that allows the shift drum to intermittently rotate in accordance with the rotation of the shift spindle.

19. The transmission according to claim 16, wherein the selection mechanism includes an intermittent feeding mechanism that allows the shift drum to intermittently rotate in accordance with the rotation of the shift spindle.

20. The transmission according to claim 11, wherein the guide portions guide the shifters to the selection positions in the first and second plurality of gear trains so that the first speed gear train and the second speed gear train of the first speed gear train, the second speed gear train, and the third speed gear train as the three consecutive gear trains from the low speed side are selected in the adjacent two predetermined rotation positions of the shift drum.

* * * * *